United States Patent [19]

Bhagat et al.

[11] Patent Number: 4,960,571

[45] Date of Patent: Oct. 2, 1990

[54] QUENCH ASSEMBLY DESIGN

[75] Inventors: Phiroz M. Bhagat; Robert M. Koros, both of Westfield; Rutton D. Patel, Berkeley Heights; Jose M. Peruyero, Morris Plains; John T. Wyatt, Florham Park, all of N.J.

[73] Assignee: Exxon Research and Engineering Company, Florham Park, N.J.

[21] Appl. No.: 284,050

[22] Filed: Dec. 14, 1988

[51] Int. Cl.⁵ .......................... B01J 10/00; B01J 8/04
[52] U.S. Cl. .................... 422/194; 422/191; 422/195; 422/220; 422/224; 261/114.1
[58] Field of Search ............... 422/191, 194, 195, 220, 422/224; 366/336, 337, 338, 340; 239/543, 555, 557, 560, 559, 566, 567, DIG. 1; 261/114.1, 114.2

[56] References Cited

U.S. PATENT DOCUMENTS

| | | | |
|---|---|---|---|
| 2,702,741 | 2/1955 | Robertson | 422/194 |
| 3,143,581 | 4/1964 | Walter | 422/220 X |
| 3,480,407 | 11/1969 | Wentworth et al. | 422/207 X |
| 3,502,445 | 3/1970 | Ballard et al. | 422/195 X |
| 3,705,016 | 12/1972 | Ludwigsen et al. | 422/195 X |
| 3,887,131 | 6/1975 | Bourne | 239/557 X |
| 4,235,847 | 11/1980 | Scott | 422/195 X |
| 4,350,665 | 9/1982 | Hashimoto et al. | 422/194 X |
| 4,514,095 | 4/1985 | Ehrfeld et al. | 366/340 |
| 4,836,989 | 6/1989 | Aly et al. | 422/191 X |

*Primary Examiner*—Robert J. Warden
*Assistant Examiner*—D. John Griffith, Jr.

*Attorney, Agent, or Firm*—Joseph J. Dvorak

[57] ABSTRACT

According to this invention, a quench assembly having improved mixing efficiency comprises a series of mixing zones: quench fluid inlet zone; quench mixing zone; a jet stirred mixing zone; and a distributor zone. In the quench fluid inlet zone, quench fluid is introduced to fluid from the catalytic bed above. The quench fluid is introduced through holes in a quench pipe, creating jets of quench fluid which entrain and mix the reactant fluid, typically partially reacted, from the bed above. This mixing zone is separated from the quench mixing zone by means of a horizontally disposed plate having a central opening therein. The reaction fluid and quench fluid enter the quench mixing zone through the central opening in the plate separating the two zones and impinge on a bottom quench mixing zone plate, where the gases are turned radially outward and passed over and around a series of mixing baffles. A plurality of pipes is located in an annular ring near the periphery of the bottom plate of the quench mixing zone for introduction of the quench gas and process fluid into a jet stirred mixing zone. Thus, the flow of fluids coming out of the quench mixing zone is introduced in a swirling direction into the jet stirred annular mixing zone, where the fluids are further mixed by mutual entrainment. Next, the fluid is turned downwardly through a central opening in a plate separating the jet stirred zone from the distributor zone. The distributor zone is provided with a distributor tray for distributing the fluid to the catalyst bed below.

8 Claims, 3 Drawing Sheets

QUENCH ASSEMBLY DESIGN

FIELD OF THE INVENTION

The present invention relates to a quench assembly particularly suitable for use in processing fluids in a series of separated catalytic beds wherein close control over the fluid temperature or composition is desired.

BACKGROUND OF THE INVENTION

Many catalytic processes are carried out in reactors which contain a series of separated catalytic beds. In such processes frequently mixing means, such as quench boxes, are disposed between beds. The purpose of the quench boxes is to provide rapid and efficient mixing of the fluid streams being processed in the reactor as they progress from one catalyst bed to the next. As will be readily appreciated, the better the mixing, the better the temperature and reaction control and, hence, the better the overall reactor performance.

Examples of such quench boxes can be found in U.S. Pat. Nos. 3,480,407, 3,723,072, 3,880,961 and 3,895,919.

Although these prior art quench boxes may have provided specific advantages over other thenknown quench boxes, experience clearly has shown that uniform temperatures and the flow of fluids to catalyst beds after introduction of quenching fluid has never been achieved to the extent desired. Consequently, there remains a need for an improved assembly to provide improved temperature uniformity in the flow of fluids to catalyst beds after introduction of a quench fluid.

SUMMARY OF THE INVENTION

According to this invention, a quench assembly having improved mixing efficiency comprises a series of mixing zones: quench fluid inlet zone; quench mixing zone; a jet stirred mixing zone; and a distributor zone. In the quench fluid inlet zone, quench fluid is introduced to the reactant fluid from the catalytic bed above. The quench fluid is introduced through holes in a quench pipe, creating jets of quench fluid which entrain and mix the reactant fluid, typically partially reacted, from the bed above. This mixing zone is separated from the quench mixing zone by means of a horizontally disposed plate having a central opening therein. The reaction fluid and quench fluid enter the quench mixing zone through the central opening in the plate separating the two zones and impinge on a bottom quench mixing zone plate, where the gases are turned radially outward and passed over and around a series of mixing baffles. A plurality of pipes is located in an annular ring near the periphery of the bottom plate of the quench mixing zone for introduction of the quench gas and process fluid into a jet stirred mixing zone. Thus, the flow of fluids coming out of the quench mixing zone is introduced in a swirling direction into the jet stirred annular mixing zone, where the fluids are further mixed by mutual entrainment. Next, the fluid is turned downwardly through a central opening in a plate separating the jet stirred mixing zone from the distributor zone. The distributor zone is provided with a distributor tray for distributing the fluid to the catalyst bed below.

This and other features of the present invention will be more readily understood upon a reading of the "Detailed Description" in conjunction with the accompanying drawings.

DETAILED DESCRIPTION OF THE PRESENT INVENTION

Figure 1:
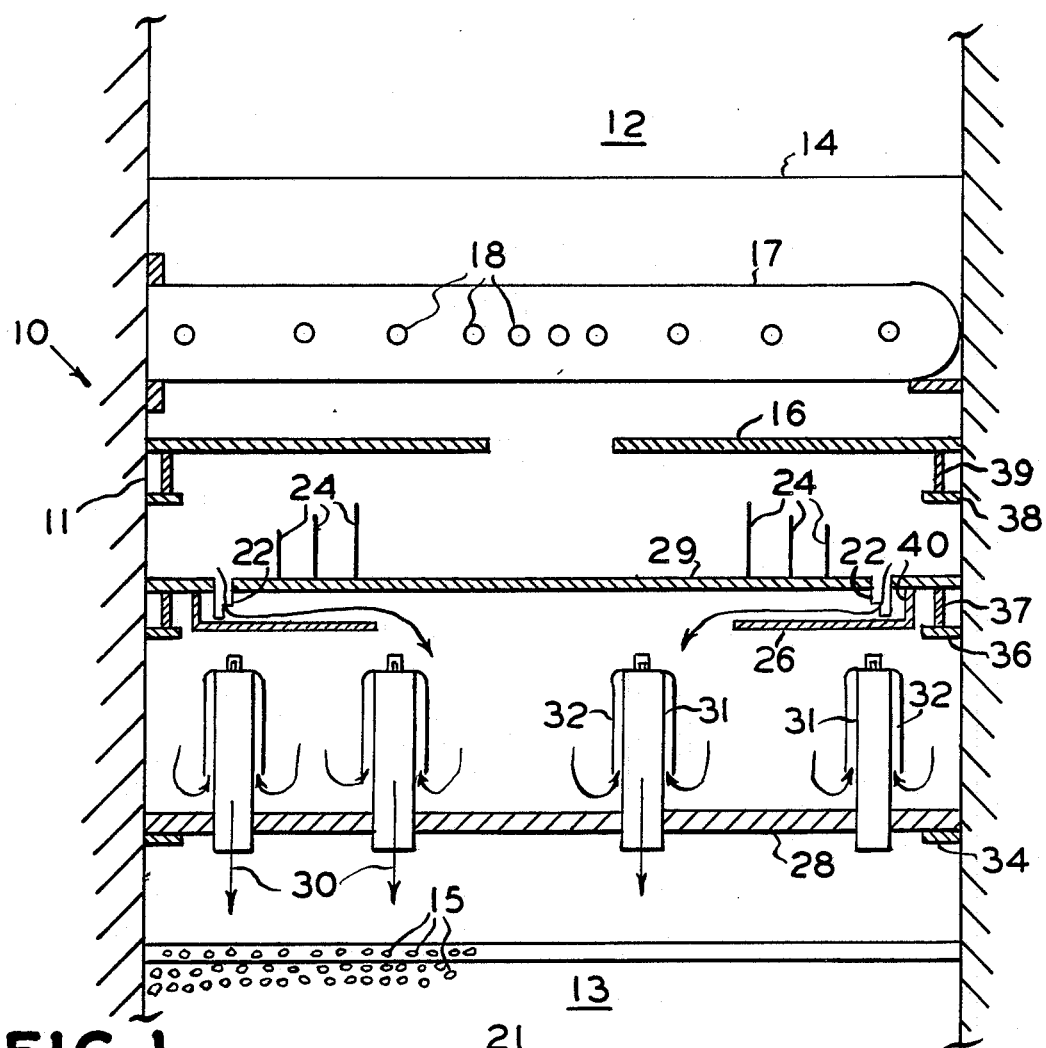
FIG. 1 is a vertical sectional view of a multi-bed catalytic reactor having a quench assembly in accordance with the present invention.

Referring first to FIG. 1 of the drawings, reference numeral 10 generally indicates a multi-bed catalytic reactor having a generally cylindrical sidewall 11 enclosing a plurality of beds of catalyst. Shown in FIG. 1 are catalyst beds 12 and 13. The bed of the catalyst is supported by a catalyst bed support 14 such as a perforated plate, a grid covered with screening and the like, which permits fluid to exit the bottom of the bed. As is known in the art, a plurality of ceramic balls, Raschig rings or the like are disposed on top of the catalyst beds to aid in the distribution of gases as they enter the bed and also to prevent catalyst particles from being disturbed from the position in which they were placed when the vessel was loaded with catalyst. In the FIG. 1 embodiment, ceramic balls 15 are shown on the top of catalyst bed 13.

Thus, each of the multiple catalyst beds within the reactor comprise catalyst particles, a lower support layer and a covering layer.

Interposed between successive catalyst beds is a quench assembly for introducing a quench fluid into the partially reacted fluid exiting from the catalyst bed above the quench assembly. The quench fluid is introduced in order to control the temperature and the composition of the process fluid as it enters the next catalyst bed, and indeed as it flows downwardly through the reactor.

As indicated previously, the quench assembly of the present invention comprises four zones: a quench fluid inlet zone; a quench mixing zone; a jet mixing zone; and a fluid distribution zone. The quench fluid zone comprises the area below the catalyst bed support 14 and the horizontally disposed top plate 16 of the quench box. A pipe or conduit 17 extends across the diameter of the reactor 10 in the quench fluid inlet zone, and has a plurality of outwardly facing holes 18 through which jets of quench fluid can be ejected into the quench fluid inlet zone substantially normal to the downward flow of fluids emanating from the catalyst bed 12 above. Thus, the jets formed from the quench fluid emanating from the holes 18 of the quench inlet pipe 17 entrains and mixes with the fluids flowing from the catalyst bed above.

As indicated, horizontally disposed plate 16 separates the quench fluid inlet zone from the quench mixing zone. As can be seen, plate 16 has a central opening through which the fluids from the quench inlet zone flow as they progress through the quench assembly. As will be readily appreciated, the size of the central opening in plate 16 is a function of the allowable pressure drop across the plate.

Figure 2:
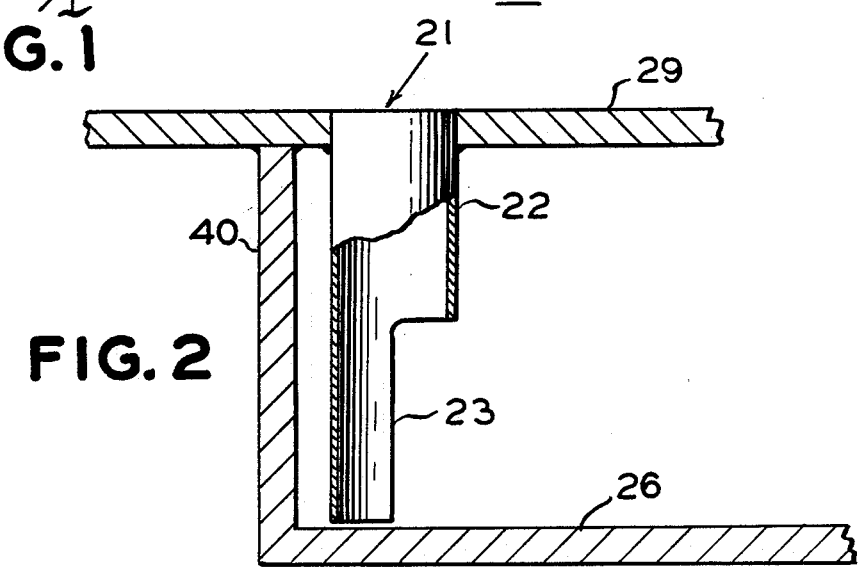
FIG. 2 is a detailed view of the quench mixing zone outlet tube in accordance with the present invention.
Figure 3:
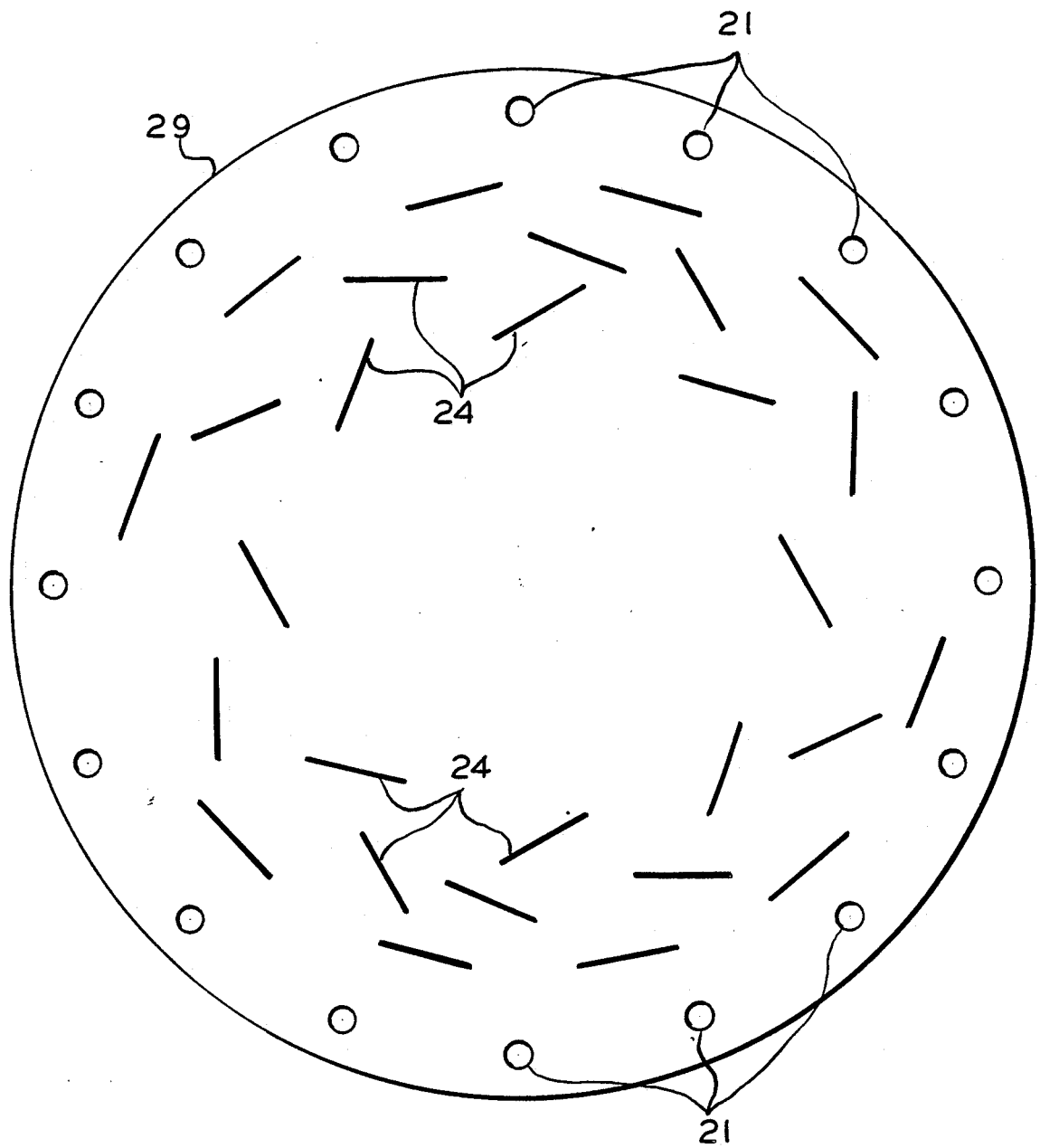
FIG. 3 is a top view of the bottom plate of quench mixing zone showing the peripheral holes and one arrangement of the quench mixing zone baffle layout of the present invention.

As a general guide for pressure drops in the range of from about 0.5 to 5 psi., the open area will be in the range of from about 1 percent to about 4 percent of the cross-sectional area of the reactor. The quench mixing zone also is provided with a lower plate 29 which is horizontally disposed in vessel 10. Plate 29 has a plurality of openings arranged in an annular ring around the periphery of plate 29. These openings 21 are best seen in FIGS. 2 and 3. Thus, the fluids entering into the quench mixing zone via the central opening in plate 16 impinge on the solid central area of plate 29, where the fluids are turned and flow radially outwardly toward the openings 21 in the plate 29.

Located in the quench mixing zone on plate 29 are a plurality of mixing baffles 24, which are arranged substantially in concentric rings between the center of plate 29 and openings 21 in the outer periphery of plate 29. These baffles 24 extend vertically upward for a distance less than the distance between plates 29 and 16. For example, they may extend from one third to two thirds of the height of the quench mixing zone, preferably about half the height of the mixing zone. As is shown in FIG. 3, the baffles in the innermost rings are disposed at a predetermined angle with respect to the tangent of a circular line in which the center of each of the inner baffles is located. Basically, the baffles are arranged such that the current eddies that result from the flow of fluids impinging on the baffle will be directed so as to impinge upon the baffle of the next annular ring of baffles. In effect, at least a substantial portion of fluid flowing radially outward toward the outer periphery impinges on a baffle.

Returning to FIG. 1 and referring also to FIG. 2, the jet stirred mixing zone is located below the quench mixing zone. This zone is defined basically by plate 29 and plate 26. As can be seen in FIG. 1, plate 26 has a vertically extended annular ring or arm portion 40 spacing the body of plate 26 from plate 29. Also, plate 26 has a large central opening therein. This opening generally will be in the range of from about 25 percent to about 75 percent, and preferably about 50 percent of the total cross-sectional area of the reactor. Arranged around the outer periphery of plate 26 and communicating with opening 21, and extending downwardly from plate 29 are the pipes 22. Pipes 22 have openings or slots 23 through which the fluids flow. These slots 23 may be opened inwardly so that fluids will be directed radially into the jet mixing zone; however, it is particularly preferred in the practice of the present invention that the slots 23 be oriented at an angle with respect to the radial line so that the fluids emanating from the pipes 22 are projected in a swirling direction, e.g. counterclockwise, thereby promoting further mixing by mutual entrainment. Thus, slots 23 may be oriented at an angle of from 0° to 90°, and preferably from about 15° to about 75° to the radial line. Indeed, a 45° orientation is most preferred.

The fluids, after they are mixed and swirled in the jet stirred mixing zone, exit via the central opening in plate 26 where they enter into the fluid distribution zone. The fluid distribution zone is defined by the plate 26 of the jet stirred mixing zone above and a plate 28 which extends horizontally across the reactor and contains a plurality of openings 30 from which there are upwardly extending conduits 31 provided with standard bubble caps 32 for controlling the flow of fluid through the distribution zone.

Figure 4:
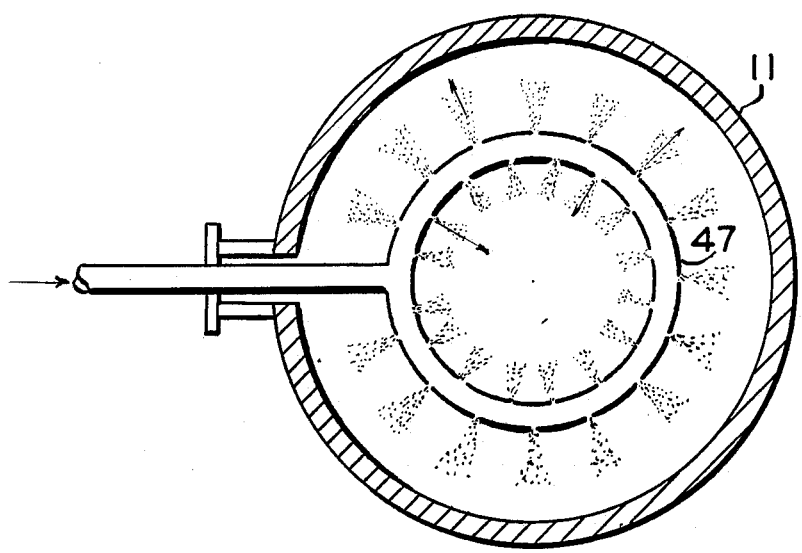
FIG. 4 is a schematic illustration of a ring sparger for introduction of quench fluid into the quench box of this invention.

In an alternate embodiment of the present invention, the quench inlet pipe 17 may, of course, be an annular sparger ring device such as ring 47 of FIG. 4.

Figure 5:
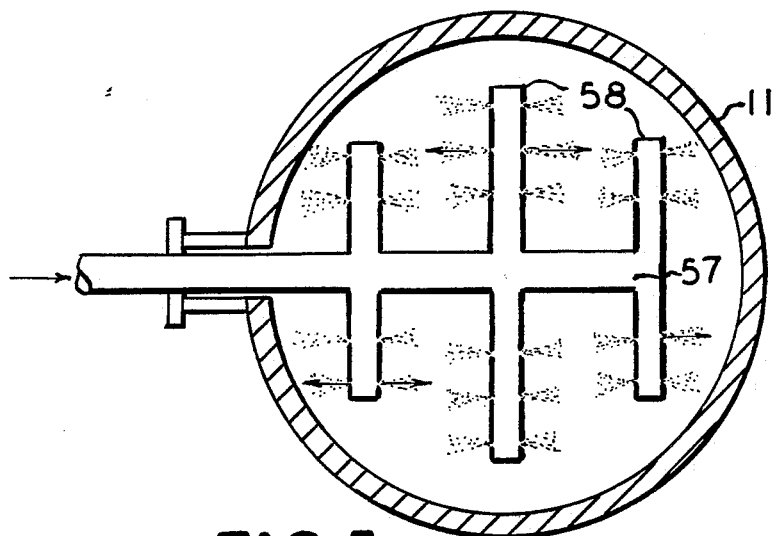
FIG. 5 is a schematic illustration of an alternate sparger for introduction of quench fluid into the quench assembly of this invention.

In yet another embodiment of the present invention shown in FIG. 5, the quench inlet pipe may consist of a plurality of lateral arms 58 extending from a central manifold 57. As is shown by the dotted lines and arrows, the openings in the quench pipes are preferably arranged so that quench fluid is injected substantially perpendicular to the flow of fluid leaving the catalyst bed.

Also, the quench assembly may be supported within the reactor in any convenient technique known in the art. Thus, as is shown in FIG. 1, plate 28 is supported by an annular ledge 34, while plates 16 and 29 are supported by ledges 36 and 38, respectively, each of which has standard supports 37 and 39 rising from the ledge to the plate being supported.

Obviously, the precise dimensions of the various zones, openings, conduits and the like in the quench assembly of the present invention will depend upon various factors such as permitted pressure drop, the space between the beds available for the quench box, and the like.

As should be readily appreciated, the present invention is, of course, suitable for use in various catalytic processes through which reactants or partially reacted reactants and quench fluids are to be homogeneously mixed so as to control the temperature profile of such materials or their composition, or both. Indeed, the fluids may be all gases or gases and liquids, depending upon the nature of the process being carried out in the reactor. Accordingly, it will be readily appreciated that there are many variations in the construction of the quench box in accordance with the present invention, and that it has broad applicability in many catalytic processes. Therefore, the invention should be limited solely by the scope of the appended claims.

What is claimed is:

1. A quench assembly having improved mixing efficiency comprising:

a quench fluid inlet zone adapted to receive fluids from a catalyst bed and including means for introducing a quench fluid into said quench fluid inlet zone;

a quench mixing zone communicating with said quench fluid inlet zone by means of a central opening in a first quench mixing zone plate therebetween, said quench mixing zone having a second plate below said first plate, said second plate having a central portion and an annular portion and a plurality of openings in the annular portion, whereby fluid entering into said quench mixing zone is deflected by said second plate and moves outwardly and radially before exiting via said plurality of openings;

baffle means located on said second plate between the center of said second plate and the openings in the annular portion, the baffle means being arranged at a predetermined tangential angle and in concentric rings wherein the baffle means in one concentric ring are positioned with respect to the baffles in the next adjacent concentric ring whereby fluids impinging on baffles in one concentric ring will result in current eddies that will be directed so as to impinge on the baffles in the next adjacent concentric ring;

a jet stirred mixing zone;

a plurality of pipes extending downwardly from said second plate of said quench mixing zone communicating with the openings therein, said pipes having slots therein oriented at a predetermined angle so as to introduce fluid exiting from said quench mixing zone into said jet stirred mixing zone in a swirling direction;

a central opening at the bottom of said jet stirred mixing zone;

a distributor zone communicating with said opening in said jet stirred mixing zone.

2. The quench assembly of claim 1 wherein the pipes are arranged in a circle having a predetermined radius and wherein the slots of said pipes are oriented at an angle of from about 15° to about 75° with respect to the radius of the circle.

3. The quench assembly of claim 1 wherein said jet stirred mixing zone is defined by the second plate of said quench mixing zone and a horizontally disposed third plate having a central opening therein and an upwardly extending annular ring side wall, said horizontally disposed third plate being located below said second plate.

4. The quench assembly of claim 1 wherein said baffle means are arranged in four concentric annular rings.

5. The quench assembly of claim 4 wherein said baffle means extend vertically upward for a distance of from about one-third to three-fourths the distance from said second plate to said first plate.

6. The quench assembly of claim 1 wherein the means for introducing quench fluid into the quench fluid inlet zone is a fluid injector.

7. The quench assembly of claim 6 wherein said fluid injector has openings arranged therein for injecting quench fluid into said quench fluid inlet zone substantially perpendicular to the vertical axis of the quench assembly.

8. In a catalytic reactor of the type having at least one quench box interposed between two catalyst beds, the improvement wherein said quench box comprises a series of mixing zones consisting essentially of:

a quench fluid inlet zone;

a quench mixing zone;

a jet stirred mixing zone and a distributor zone;

said quench fluid inlet zone being adapted to receive fluids from a catalyst bed and including means for introducing jets of quench fluid substantially horizontally into the quench fluid zone;

said quench mixing zone disposed below said quench fluid inlet zone and separated therefrom by a horizontally disposed first plate having a central opening therein;

said quench mixing zone having a second plate below said first plate and including a central portion and an annular ring portion, the annular ring portion having a plurality of openings therein, whereby fluid entering into said quench mixing zone is deflected by said bottom plate and moves outwardly and radially before exiting via said plurality of openings;

baffle means located on said second plate between the central portion of said second plate and the openings in the annular ring portion, said baffles being arranged at a predetermined tangential angle and in concentric rings wherein the baffles in one concentric ring are positioned with respect to the baffles in the next adjacent concentric ring whereby fluids impinging on baffles in one concentric ring will result in current eddies that will be directed so as to impinge on the baffles in the next adjacent concentric ring;

said jet stirred mixing zone being disposed below said quench mixing zone and including a third plate having a central opening therein;

a plurality of pipes extending downwardly from said second plate of said quench mixing zone communicating with the peripheral openings therein, said pipes having slots therein oriented at a predetermined angle to introduce fluids exiting from said quench mixing zone into said jet stirred mixing zone in a swirling direction;

said distributor zone disposed below said jet stirred mixing zone and including a horizontally disposed fourth plate having a plurality of openings therein whereby fluids flow through the distributor zone to the catalyst bed below.

* * * * *